Jan. 19, 1943.     W. F. GOFF     2,309,061
INFLATION VALVE
Filed Dec. 16, 1939     2 Sheets-Sheet 1
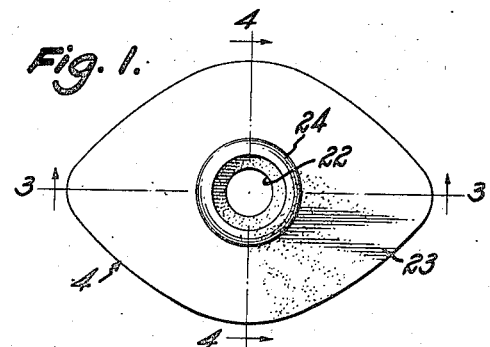
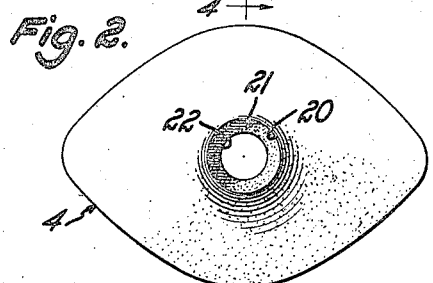
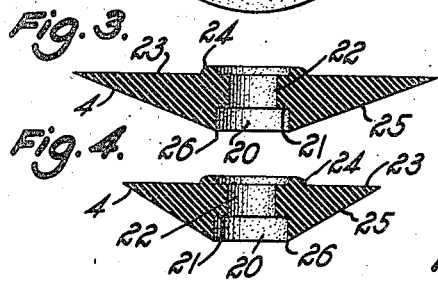
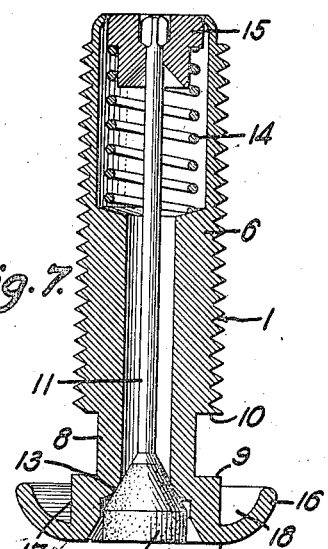
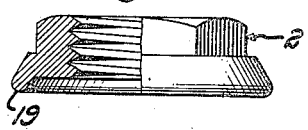
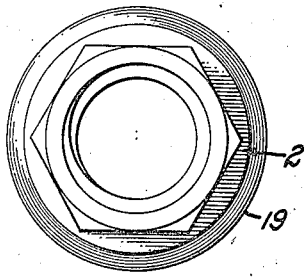
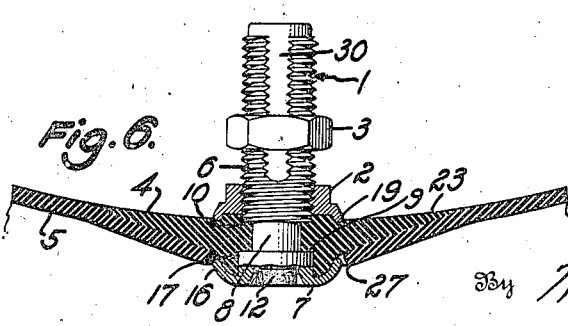
Inventor
William F. Goff
By W. J. Finckel Jr.
Attorney

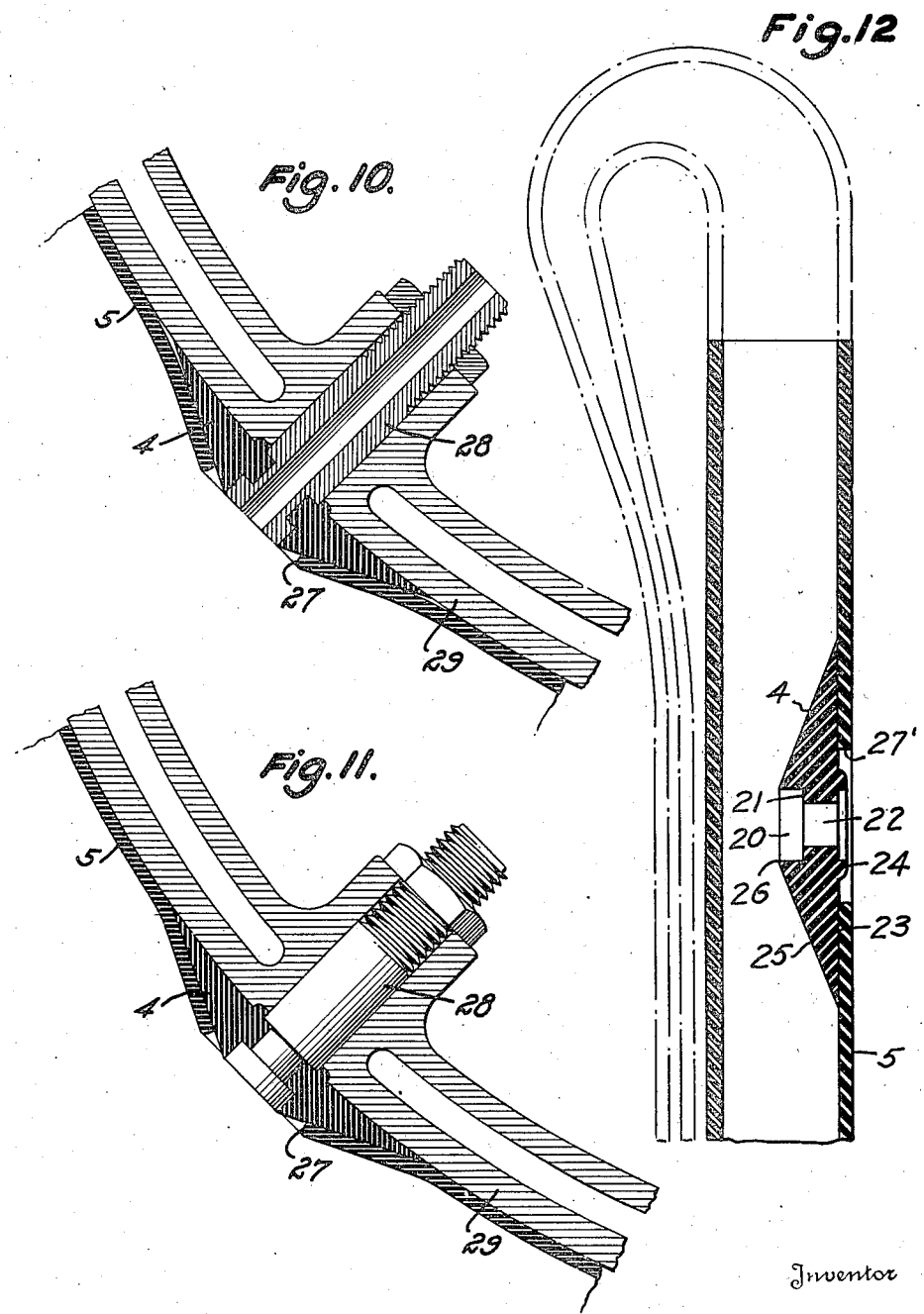

Patented Jan. 19, 1943

2,309,061

UNITED STATES PATENT OFFICE 2,309,061

INFLATION VALVE

William F. Goff, Akron, Ohio, assignor to The Ohio Injector Company, Wadsworth, Ohio, a corporation of Ohio Application December 16, 1939, Serial No. 309,664

4 Claims. (Cl. 152—430)

This invention relates to valves for inflatable articles, and it has reference particularly to inflation valves for bicycle tires, especially those employing inner tubes and casings or shoes.

The object of the invention is to provide an inflation valve having a metal body carrying the valve proper, this body being capable of removal from and replacement in the tire, and being joined fluid-tight to the tire by purely mechanical means. Thus the curing or vulcanizing of rubber to metal, now prevalent in assembly of valves with tires and tubes, is made unnecessary, and production facilitated and expedited.

Moreover, the capability of the metal parts of being removed from and replaced in the tire or tube makes possible the association with any tube of any valve assembly.

The invention contemplates an inflation valve including a metal valve body so shaped as to mechanically interlock with complementally shaped yieldable means of the tire, the body and yieldable means having contacting portions which, upon application of pressure, furnished by an adjustable clamping member applied to the body and bearing against the yieldable means, will compress the yieldable means and cause such means to engage the body in a fluid-tight and normally inseparable manner, all as will be explained hereinafter more fully and finally claimed.

In the accompanying drawings illustrating the invention, in the several figures of which like parts are similarly designated:

Figure 1 is a top plan view of the yieldable means or pad element carried by the tire or tube or other inflatable article.

Fig. 2 is a bottom plan view thereof.

Figs. 3 and 4 are sections taken respectively on the lines 3—3 and 4—4 of Fig. 1.

Fig. 5 is a fragmentary sectional view illustrating a preliminary position of assembly of a pad element with respect to a tire or tube.

Fig. 6 is a view similar to Fig. 5 but showing the parts after curing and with the metal valve parts assembled therewith.

Fig. 7 is an enlarged axial sectional elevation of the valve body and the associated parts of the valve proper.

Fig. 8 is an enlarged sectional elevation of the clamping member.

Fig. 9 is a top plan view of the clamping member.

Figs. 10 and 11 are fragmentary sectional views illustrative of the curing or vulcanizing operations.

Fig. 12 illustrates a modified assembly of the pad element with a tire tube.

The metal parts of the valve comprise a valve body 1, a clamping member 2 and a rim locking nut 3, these parts being cooperatively assembled, as will be explained hereinafter, with the complementally pre-molded and semi-cured yieldable means or pad 4 after the pad has been affixed to the tire or tube 5 during the curing or vulcanization of the latter, the semi-cured pad also being fully cured during this operation of vulcanization.

The valve body 1 has a screw threaded stem 6 and a head 7, the same being joined by a shank 8 of reduced diameter which provides shoulders 9 and 10 on the head and stem, respectively, for cooperation with complemental portions of the pad 4.

Valve means proper, including a valve pin 11 with its valve 12 normally seating at 13 in the body, and a valve spring 14 and washer 15, are operatively assembled within and carried by the body 1. The parts of the valve proper, and their mode of assembly are substantially the same as are disclosed in my copending applications Serial No. 275,114, filed May 22, 1939, and Serial No. 349,894, filed August 2, 1940, and in copending applications of George G. Allenbaugh and Ralph D. Bixler, Serial No. 333,036, filed May 2, 1940, and Victor M. Weltzien and Ralph D. Bixler, Serial No. 305,160, filed Nov. 18, 1939.

The base 7 of the body 1 is formed with an axially out-turned flange 16 forming between it and the wall 17 of the base an annular socket 18 to receive a portion of the yieldable pad 4.

The clamping member 2 is preferably in the form of a nut interiorly screw threaded for cooperation with the screw threads of the stem 6 for adjustment axially thereof, and is provided at its inner face with an axially off-standing peripheral rim 19 to exert compressive clamping pressure upon the outer face of the pad 4.

The rim locking nut 3 may be of any form suitable to bear upon the adjacent face of the rim upon which the tire is mounted to thereby hold the valve stem in proper relation to the rim opening, the adjacent portions of the rim being secured between the outer surface of the clamping member 2 and the inner surface of the locking nut 3, as will be apparent.

The yielding means or pad 4 is formed of appropriate vulcanizable rubber compound, and is preferably semi-cured so as to retain its shape and enable it to be employed without danger of distortion or injury during handling and while undergoing its application by vulcanization to the tire or tube. This pad element may be of elliptical form in plan, as shown, or it may be of any other shape desired best suited to accommodate it to the tire, tube or other inflatable article to which it is applied, and is molded to a thickness appropriate to provide for the formation of the two-diameter axial bore the larger portion 20 of which provides a shoulder 21 for engagement with the shoulder 9 of the valve body 1, and the smaller portion 22 of which will engage the shank 8 of the body 1. The exterior face 23 of the pad element is preferably flat and carries an annular bead 24 surrounding the bore 20—22 and designed for cooperative reception within the rim 19 of the clamping member 2. The interior face 25 of the pad element is of substantially frusto-conical form having its truncated end terminating in a lip 26 surrounding the portion 20 of the bore and designed to be received within the annular socket 18 of the valve body 1. It will thus be seen that the yieldable pad 4 may be considered as a truncated substantially conical member having its exterior surface 23 forming the base and the lip 26 constituting its truncated end.

As illustrated in Figs. 5, 6, 10 and 11, the wall of the tire, tube or other inflatable article, is provided with an opening 27 with respect to which the pad element 4 may be substantially centered, preferably exteriorly of the wall and, with an air-introducing adapter 28 appropriately shaped to engage the bore 20—22, inserted in the pad element, the inflatable article and properly located pad element are placed in a curing or vulcanizing mold 29 substantially as shown in Fig. 10.

Thereafter, introduction of a pressure fluid, air for example, through the adapter 28 and into the interior of the article will cause the wall thereof to intimately engage the walls of the mold and the adjacent surface of the pad element, as shown in Fig. 11, whereafter application of heat of vulcanizing temperature will cause the parts to unite, thus completing curing of the semi-cured pad element and of the article simultaneously, and inseparably connecting them. It will be noted, moreover, that upon completion of vulcanization the outer surface of the wall of the inflatable article will be smooth, the outer surface 23 of the pad element blending therewith, while the frusto-conical inner surface 25 of the pad element projects, unchanged, into the interior of the article.

Obviously, upon completion of the curing operation, the pad element will be sufficiently resilient and capable of withstanding strain to permit extraction of the adapter 28 without injury to the formation of its bore 20—22, bead 24 and lip 26, and thereafter the metal valve parts may be properly applied and assembled (Fig. 6) as follows: First the base 7 of the body is forced through the bore 20—22 of the pad element 4, so that the lip 26 enters the annular socket 18, and bore portion 22 engages shank 8, thus engaging the complemental shoulders 9 and 21. Then the clamping member 2 is screwed down on the stem 6 to bring its rim 19 into encircling engagement with the bead 24. Continued screwing down of the clamping member 2 will cause the material of the pad 4 to be compressed, by the flange 16 of the body 1 and the rim 19 of the member 2, radially inwardly into intimate fluid-tight engagement with the shank 8 and stem 6 of the body. Moreover, the clamping of the parts thus obtained will prevent their separation under ordinary conditions of use, but removal and replacement of the body and the parts of the valve proper carried thereby may be accomplished, when desired, by releasing the clamping member 2.

When the tire is mounted upon a rim, with the stem 6 extending through the opening therein, the locking nut 3 may be applied and screwed down as hereinbefore explained.

In order to hold the valve body against rotation while adjusting the clamping member 2 and locking nut 3, the body may be provided with flattened surfaces 30 extending along diametrically opposite portions of its stem in a well-known manner. However, it will be noted (Fig. 6) that these flattened portions do not extend the full length of the stem but terminate in a zone outside of the portion ultimately engaged by the clamping member 2, thus ensuring full-thread engagement between the stem and clamping member and also between the stem and portions of the pad element 4 compressed by the rim 19 of the clamping member, to thereby provide a most effective fluid seal between the parts.

Although the pad element 4 is preferably applied to the outer surface of the wall of the tire, tube or other inflatable article, it may, if desired, be applied to the inner surface thereof, as shown in Fig. 12. In the case of a tire tube, especially, this may be done as follows: As a tube in unspliced condition, that is to say before its ends are joined, comes down the assembly line, an opening similar to the opening 27' is punched in its wall about four or five inches from one of the ends where the splice is to be made. The semi-cured pad 4 is then reached into the end of the tube and put in place with its exterior face 23 against the inside surface of the tube wall and its bore 20—22 located axially of the previously formed opening 27' therein, it being understood, of course, that the opening is large enough to clear the bead 24, and the clamping member 2 later applied. After the pad is thus put in place the tube ends are spliced together and the tube is sent on to the curing mold. Of course an adapter similar to the adapter 28 of Figs. 10 and 11 will be used, and this adapter may be applied to the pad element 4 either prior or subsequent to its location within the tube.

Whether the pad element 4 is applied exteriorly or interiorly of the tube, it will be understood that, due to its semi-cured condition, and the uncured or semi-cured condition of the tube, it will adhere to the tube, prior to vulcanization, with tenacity sufficient to prevent it from becoming displaced during handling and while being fitted and arranged in the curing mold.

Various changes are considered to be within the spirit of the invention and the scope of the following claims.

What I claim is:

1. Inflation valve means for an inflatable article, such as a tire tube, including yieldable means in the form of a substantially frusto-conical pad affixed to a wall of the inflatable article and cooperating with an opening in said wall, said pad having a bore and presenting interiorly and exteriorly of said wall surfaces complemental to metal parts for fluid-tight assembly with said pad, said metal parts including a valve body carrying the valve proper, and a clamping member, said body having a stem passing through the bore of said pad, and a base joined to said stem by a shank of reduced diameter providing opposed shoulders on the base and stem, and the bore of said pad being preformed for complemental engagement with said base and shank and between said shoulders to provide a separable mechanical connection between the body and pad, said base and the interior surface of said pad being formed for substantially interfitting engagement whereby said base embraces and confines the truncated end of the pad, and said clamping member being axially adjustable upon said stem for engaging the exterior surface of the pad and thus serving by application of clamping pressure exerted between it and said base to compress the pad into fluid-tight engagement with said shank between said shoulders.

2. Inflation valve means for an inflatable article, such as a tire tube, including yieldable means on a wall of the inflatable article and having a bore and presenting interiorly and exteriorly of said wall surfaces complemental to metal parts for fluid-tight assembly with said yieldable means, said metal parts including a valve body carrying the valve proper, and a clamping member, said body having a stem passing through the bore of said yieldable means, and a base joined to said stem by a shank of reduced diameter providing opposed shoulders on the base and stem, said yieldable means being provided with an annular lip for compressible engagement with said base, and its bore being preformed for complemental engagement with said base and shank between said shoulders to provide a separable mechanical connection between the body and yieldable means, said base having an axially out-turned flange providing an annular socket embracing said lip, and said clamping member being axially adjustable upon said stem for engaging the exterior surface of the yieldable means, said clamping means serving by application of clamping pressure exerted between it and said base to cause the out-turned flange of said base to deform the annular lip of the yieldable means and radially compress said yieldable means into engagement with said shank and between said shoulders.

3. Inflation valve means for an inflatable article, such as a tire tube, including yieldable means on a wall of the inflatable article and having a bore and presenting interiorly and exteriorly of said wall surfaces complemental to metal parts for fluid-tight assembly with said yieldable means, said metal parts including a valve body carrying the valve proper, and a clamping member, said body having a stem passing through the bore of said yieldable means, and a base joined to said stem by a shank of reduced diameter providing opposed shoulders on the base and stem, and the bore of said yieldable means being preformed for complemental engagement with said base and shank and between said shoulders to provide a separable mechanical connection between the body and yieldable means, said base and the interior surface of said yieldable means being formed for substantially interfitting engagement, and said clamping member being axially adjustable upon said stem for engaging the exterior surface of the yieldable means and thus serving by application of clamping pressure exerted between it and said base to compress the yieldable means into fluid-tight engagement with said shank between said shoulders, the yieldable means having upon its exterior surface a compressible bead for cooperation with said clamping member.

4. In inflation valve means as claimed in claim 3, the clamping member having a rim for embracing and confining said bead, cooperation between said bead and rim serving upon application of clamping pressure to force the yieldable means radially into engagement with said shank and stem.

WILLIAM F. GOFF.

CERTIFICATE OF CORRECTION.

Patent No. 2,309,061. January 19, 1943.

WILLIAM F. GOFF.

It is hereby certified that error appears in the printed specification of the above numbered patent requiring correction as follows: Page 2, second column, line 33, before "similar" insert --27'--; same line, after "opening" second occurrence, for "27'" read --27--; and that the said Letters Patent should be read with this correction therein that the same may conform to the record of the case in the Patent Office.

Signed and sealed this 16th day of March, A. D. 1943.

(Seal) Henry Van Arsdale,
Acting Commissioner of Patents.